(12) United States Patent
Inage et al.

(10) Patent No.: US 10,757,280 B2
(45) Date of Patent: Aug. 25, 2020

(54) IMAGE READER, IMAGE FORMING APPARATUS, AND IMAGE DENSITY CORRECTING METHOD

(71) Applicants: Osamu Inage, Kanagawa (JP); Masamoto Nakazawa, Kanagawa (JP); Daisuke Nikaku, Kanagawa (JP); Ryohma Ikemoto, Kanagawa (JP); Hideki Hashimoto, Tokyo (JP); Shinichiroh Wada, Kanagawa (JP)

(72) Inventors: Osamu Inage, Kanagawa (JP); Masamoto Nakazawa, Kanagawa (JP); Daisuke Nikaku, Kanagawa (JP); Ryohma Ikemoto, Kanagawa (JP); Hideki Hashimoto, Tokyo (JP); Shinichiroh Wada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/256,212

(22) Filed: Jan. 24, 2019

(65) Prior Publication Data

US 2019/0238717 A1 Aug. 1, 2019

(30) Foreign Application Priority Data

Jan. 26, 2018 (JP) .................................. 2018-011915

(51) Int. Cl.
*H04N 1/00* (2006.01)
*H04N 1/407* (2006.01)
*G03G 15/00* (2006.01)

(52) U.S. Cl.
CPC ..... *H04N 1/00673* (2013.01); *G03G 15/5062* (2013.01); *H04N 1/00602* (2013.01);
(Continued)

(58) Field of Classification Search
CPC combination set(s) only.
See application file for complete search history.

(56) References Cited

U.S. PATENT DOCUMENTS

| 4,918,489 A | 4/1990 | Inage et al. |
| 5,194,879 A | 3/1993 | Kotabe et al. |

(Continued)

FOREIGN PATENT DOCUMENTS

| CN | 102099672 A | 6/2011 |
| CN | 102556704 A | 7/2012 |

(Continued)

OTHER PUBLICATIONS

U.S. Appl. No. 8/778,762, filed Jan. 6, 1997, Shinji Yamakawa, et al.

(Continued)

*Primary Examiner* — Barbara D Reinier
(74) *Attorney, Agent, or Firm* — Oblon, McClelland, Maier & Neustadt, L.L.P.

(57) ABSTRACT

An image reader includes a reading device to read an image on a recording medium, a first conveying roller pair upstream of the reading device in a conveyance direction of the recording medium, a second conveying roller pair downstream of the reading device in the conveyance direction, to hold the recording medium together with the first conveying roller pair to convey the recording medium, and a driver to drive the first conveying roller pair and the second conveying roller pair so that a relative relation between a reading position of the reading device and the recording medium held by the first conveying roller pair and the second conveying roller pair is constant. The reading device determines that the image read from the recording medium is effective in a period in which the relative relation is constant.

10 Claims, 10 Drawing Sheets

(52) U.S. Cl.
CPC ..... *H04N 1/00652* (2013.01); *H04N 1/00793* (2013.01); *H04N 1/4078* (2013.01); *H04N 2201/0094* (2013.01)

(56) References Cited

U.S. PATENT DOCUMENTS

| | | | |
|---|---|---|---|
| 5,350,900 A | 9/1994 | Inage et al. | |
| 5,565,907 A | 10/1996 | Wada et al. | |
| 5,892,595 A | 4/1999 | Yamakawa et al. | |
| 5,949,922 A | 9/1999 | Wada et al. | |
| 5,949,924 A | 9/1999 | Noguchi et al. | |
| 6,023,537 A | 2/2000 | Wada et al. | |
| 6,023,538 A | 2/2000 | Noguchi et al. | |
| 6,078,703 A | 6/2000 | Noguchi et al. | |
| 6,122,412 A | 9/2000 | Noguchi et al. | |
| 6,198,349 B1 | 3/2001 | Kanno et al. | |
| 2002/0036805 A1 | 3/2002 | Kanno et al. | |
| 2002/0092909 A1 | 7/2002 | Inage | |
| 2002/0135812 A1 | 9/2002 | Inage | |
| 2004/0057087 A1 | 3/2004 | Wada | |
| 2004/0061893 A1 | 4/2004 | Wada | |
| 2007/0013954 A1 | 1/2007 | Soeda et al. | |
| 2007/0188638 A1 | 8/2007 | Nakazawa et al. | |
| 2007/0216962 A1 | 9/2007 | Inage | |
| 2008/0252787 A1 | 10/2008 | Nakazawa et al. | |
| 2009/0128864 A1 | 5/2009 | Inage | |
| 2010/0027061 A1 | 2/2010 | Nakazawa | |
| 2010/0171998 A1 | 7/2010 | Nakazawa | |
| 2011/0026083 A1 | 2/2011 | Nakazawa | |
| 2011/0026085 A1 | 2/2011 | Tsukahara et al. | |
| 2011/0051201 A1 | 3/2011 | Hashimoto et al. | |
| 2011/0063488 A1 | 3/2011 | Nakazawa | |
| 2012/0008173 A1 | 1/2012 | Konno et al. | |
| 2012/0092732 A1 | 4/2012 | Nakazawa | |
| 2012/0175837 A1* | 7/2012 | Osakabe ............. H04N 1/0057 271/3.24 |
| 2012/0224205 A1 | 9/2012 | Nakazawa | |
| 2013/0044338 A1 | 2/2013 | Nikaku | |
| 2013/0063792 A1 | 3/2013 | Nakazawa | |
| 2014/0029065 A1 | 1/2014 | Nakazawa | |
| 2014/0078532 A1 | 3/2014 | Nikaku | |
| 2014/0204427 A1 | 7/2014 | Nakazawa | |
| 2014/0204432 A1 | 7/2014 | Hashimoto et al. | |
| 2014/0211273 A1 | 7/2014 | Konno et al. | |
| 2014/0368893 A1 | 12/2014 | Nakazawa et al. | |
| 2015/0071661 A1 | 3/2015 | Yamashina et al. | |
| 2015/0098117 A1 | 4/2015 | Marumoto et al. | |
| 2015/0116794 A1 | 4/2015 | Nakazawa | |
| 2015/0163378 A1 | 6/2015 | Konno et al. | |
| 2015/0222790 A1 | 8/2015 | Asaba et al. | |
| 2015/0304517 A1 | 10/2015 | Nakazawa et al. | |
| 2016/0003673 A1 | 1/2016 | Hashimoto et al. | |
| 2016/0006961 A1 | 1/2016 | Asaba et al. | |
| 2016/0088179 A1 | 3/2016 | Nakazawa et al. | |
| 2016/0112660 A1 | 4/2016 | Nakazawa et al. | |
| 2016/0119495 A1 | 4/2016 | Konno et al. | |
| 2016/0173719 A1 | 6/2016 | Hashimoto et al. | |
| 2016/0219163 A1 | 7/2016 | Shirado et al. | |
| 2016/0268330 A1 | 9/2016 | Nakazawa et al. | |
| 2016/0295138 A1 | 10/2016 | Asaba et al. | |
| 2016/0373604 A1 | 12/2016 | Hashimoto et al. | |
| 2017/0019567 A1 | 1/2017 | Konno et al. | |
| 2017/0094116 A1* | 3/2017 | Yoshida ............... H04N 1/4078 |
| 2017/0163836 A1 | 6/2017 | Nakazawa | |
| 2017/0170225 A1 | 6/2017 | Asaba et al. | |
| 2017/0201700 A1 | 7/2017 | Hashimoto et al. | |
| 2017/0244853 A1 | 8/2017 | Yabuuchi et al. | |
| 2017/0246881 A1* | 8/2017 | Inokuchi .................. B41J 2/355 |
| 2017/0295298 A1 | 10/2017 | Ozaki et al. | |
| 2017/0302821 A1 | 10/2017 | Sasa et al. | |
| 2017/0324883 A1 | 11/2017 | Konno et al. | |
| 2018/0139345 A1 | 5/2018 | Goh et al. | |
| 2018/0146150 A1 | 5/2018 | Shirado et al. | |
| 2018/0175096 A1 | 6/2018 | Inoue et al. | |
| 2018/0213124 A1 | 7/2018 | Yokohama et al. | |
| 2018/0261642 A1 | 9/2018 | Asaba et al. | |
| 2018/0364102 A1* | 12/2018 | Nagashima ............. G01J 3/524 |

FOREIGN PATENT DOCUMENTS

| | | |
|---|---|---|
| CN | 107073975 A | 8/2017 |
| JP | 2015-052707 | 3/2015 |
| JP | 2017-088389 | 5/2017 |
| WO | WO2010/008067 A1 | 1/2010 |
| WO | WO2016/098528 | 6/2016 |

OTHER PUBLICATIONS

U.S. Appl. No. 16/135,578, filed Sep. 19, 2018, Daisuke Nikaku, et al.

U.S. Appl. No. 16/155,781, filed Oct. 9, 2018, Tatsuya Ishii, et al.

U.S. Appl. No. 16/155,802, filed Oct. 9, 2018, Tatsuya Ishii, et al.

* cited by examiner

IMAGE READER, IMAGE FORMING APPARATUS, AND IMAGE DENSITY CORRECTING METHOD

CROSS-REFERENCE TO RELATED APPLICATION

This patent application is based on and claims priority pursuant to 35 U.S.C. § 119(a) to Japanese Patent Application No. 2018-011915, filed on Jan. 26, 2018, in the Japan Patent Office, the entire disclosure of which is hereby incorporated by reference herein.

BACKGROUND

Technical Field

The present disclosure relates to an image reader, an image forming apparatus, and a density correcting method.

Related Art

A technology is known for reading an arbitrary color patch on a recording medium, on which an image has been formed, by a reading device and correcting image formation conditions (color, density unevenness, and the like).

SUMMARY

In an aspect of the present disclosure, there is provided an image reader that includes a reading device, a first conveying roller pair, a second conveying roller pair, and a driver. The reading device reads an image on a recording medium. The first conveying roller pair is upstream of the reading device in a conveyance direction of the recording medium. The second conveying roller pair is downstream of the reading device in the conveyance direction of the recording medium, to hold the recording medium together with the first conveying roller pair to convey the recording medium. The driver drives the first conveying roller pair and the second conveying roller pair so that a relative relation between a reading position of the reading device and the recording medium held by the first conveying roller pair and the second conveying roller pair is constant. The reading device determines that the image read from the recording medium is effective in a period in which the relative relation is constant.

In another aspect of the present disclosure, there is provided a density correcting method that includes controlling, driving, and reading. The controlling controls a reading device to read a color patch printed in advance on a recording medium and perform density correction. The driving drives a first conveying roller pair and a second conveying roller pair so that a relative relation between a reading position of the reading device and the recording medium held by the first conveying roller pair upstream of the reading device in a conveyance direction of the recording medium and the second conveying roller pair downstream of the reading device in the conveyance direction of the recording medium is constant. The reading reads the color patch used for the density correction from the recording medium in a period in which the relative relation is constant.

In still another aspect of the present disclosure, there is provided a non-transitory recording medium storing computer-readable program code which causes one or more processors to execute density correcting processing. The processing includes controlling, driving, and reading. The controlling controls a reading device to read a color patch printed in advance on a recording medium and perform density correction. The driving drives a first conveying roller pair and a second conveying roller pair so that a relative relation between a reading position of the reading device and the recording medium held by the first conveying roller pair upstream of the reading device in a conveyance direction of the recording medium and the second conveying roller pair downstream of the reading device in the conveyance direction of the recording medium is constant. The reading reads the color patch used for the density correction from the recording medium in a period in which the relative relation is constant.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
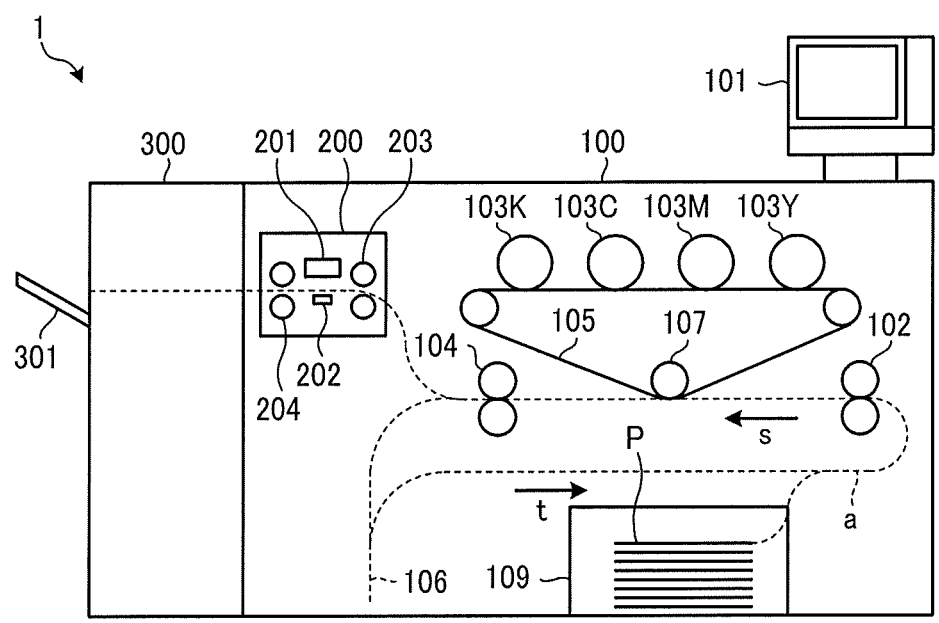
FIG. 1 is a schematic diagram of an exemplary hardware configuration of a printing system according to an embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of an image reader, an image forming apparatus, and a density correcting method will be described in detail below with reference to the attached drawings. A case where the image reader, the image forming apparatus, and the density correcting method are applied to a printing system including a printing apparatus such as a commercial printer (production printer) which sequentially prints a large number of sheets in a short period of time will be described as an example. However, an embodiment of the present disclosure is not limited to the example.

Description of Hardware Configuration of Printing System FIG. 1 is a schematic diagram of an exemplary hardware configuration of a printing system 1 according to an embodiment. As illustrated in FIG. 1, the printing system 1 which is an image forming apparatus includes a printing apparatus 100, an image reader 200, and a stacker 300.

The printing apparatus 100 includes an operation panel 101, tandem-type electrophotographic image forming units 103Y, 103M, 103C, and 103K, a transfer belt 105, a secondary transfer roller 107, a paper feeding unit 109, a conveying roller pair 102, a fixing roller 104, and a reverse path 106.

The operation panel 101 is an operation display which performs various operation inputs to the printing apparatus 100 and the image reader 200 and displays various screens.

Each of the image forming units 103Y, 103M, 103C, and 103K performs an image formation process (charging process, exposing process, developing process, transferring process, and cleaning process) to form a toner image, and transfers the formed toner image on the transfer belt 105. In the present embodiment, it is assumed that a yellow toner image be formed on the image forming unit 103Y, a magenta toner image be formed on the image forming unit 103M, a cyan toner image be formed on the image forming unit 103C, and a black toner image be formed on the image forming unit 103K. However, embodiments of the present disclosure are not limited to such a configuration.

The transfer belt 105 conveys the toner images which are superimposed and transferred from the image forming units 103Y, 103M, 103C, and 103K (full-color toner image) to a secondary transfer position of the secondary transfer roller 107. In the present embodiment, first, the yellow toner image is transferred on the transfer belt 105, and thereafter, the magenta toner image, the cyan toner image, and the black toner image are subsequently superimposed and transferred. However, embodiments of the present disclosure are not limited to such a configuration.

A plurality of sheets P to be processed (conveyed) which is a recording medium is stacked and housed in the paper feeding unit 109, and the paper feeding unit 109 feeds the sheet P. The sheet P is, for example, recording paper (transfer paper). However, the sheet P is not limited to this and may be any image recordable medium, for example, coat paper, heavy paper, an Overhead Projector (OHP) sheet, a plastic film, prepreg, and copper foil.

The conveying roller pair 102 conveys the sheet P fed by the paper feeding unit 109 in a direction of arrow s on a conveying path a.

The secondary transfer roller 107 collectively transfers the full-color toner images conveyed by the transfer belt 105 at the secondary transfer position on the sheet P conveyed by the conveying roller pair 102.

The fixing roller 104 heats and pressurizes the sheet P on which the full-color toner image has been transferred to fix the full-color toner image on the sheet P.

In a case of single-sided printing, the printing apparatus 100 sends the sheet P which is a printed matter on which the full-color toner image has been fixed to the image reader 200. On the other hand, in a case of double-sided printing, the printing apparatus 100 sends the sheet P on which the full-color toner image has been fixed to the reverse path 106.

The reverse path 106 switches back the sent sheet P to reverse a front surface and a rear surface of the sheet P and convey the sheet P in a direction of arrow. The sheet P conveyed by the reverse path 106 is conveyed again by the conveying roller pair 102, a full-color toner image is transferred on a surface opposite to the previous side by the secondary transfer roller 107 and is fixed by the fixing roller 104. Then, the sheet P is sent to the image reader 200 and the stacker 300 as a printed matter.

The image reader 200 positioned on a downstream side of the printing apparatus 100 includes a reading device 201 and a density reference member 202.

The reading device 201 can be implemented by, for example, a Contact Image Sensor (CIS) in which a plurality of imaging elements (CMOS image sensor) is aligned in a line. The reading device 201 receives reflection light from a reading object (object) and outputs an image signal. Specifically, the reading device 201 reads the sheet P sent from the printing apparatus 100 and the density reference member 202.

Then, the image reader 200 ejects the sheet P of which reading has been completed to the stacker 300.

The stacker 300 includes a tray 301. The stacker 300 stacks the sheet P ejected by the image reader 200 on the tray 301.

Next, the image reader 200 will be described.

Figure 2:
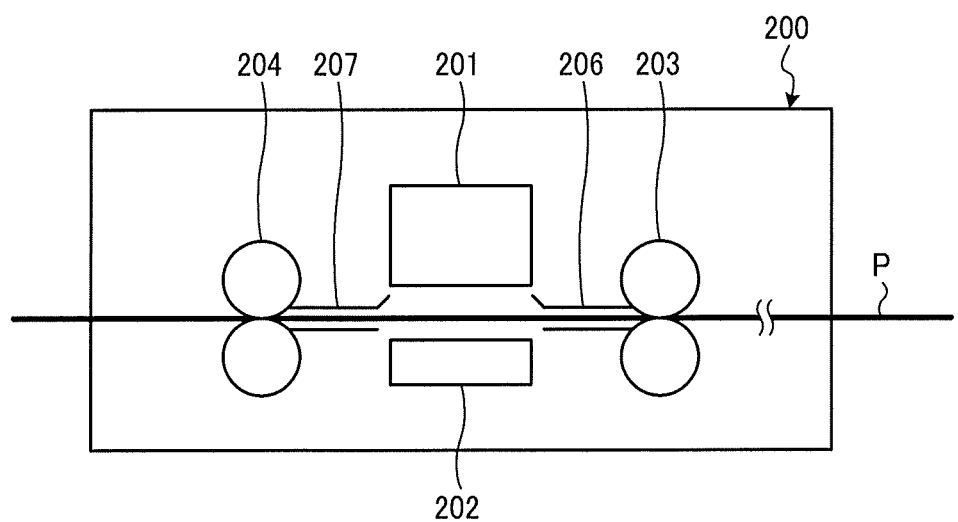
FIG. 2 is a diagram schematically illustrating a configuration of an image reader.

Here, FIG. 2 is a diagram schematically illustrating a configuration of the image reader 200. The image reader 200 illustrated in FIG. 2 conveys the sheet P to be read from the right to the left in FIG. 2.

As illustrated in FIG. 2, the image reader 200 includes the reading device 201 which obtains an image, a first conveying roller pair 203 provided on an upstream side of the reading device 201 in a conveyance direction of the sheet P, and a second conveying roller pair 204 provided on a downstream side of the reading device 201 in the conveyance direction of the sheet P. A roller radius of a roller of the second conveying roller pair 204 is designed to be slightly larger than a roller radius of a roller of the first conveying roller pair 203.

Furthermore, in the image reader 200, the density reference member 202 is arranged at a position facing the reading device 201. The density reference member 202 is used as a reference of a reading level of the reading device 201, and for example, is a white board. The density reference member 202 is used to create reference data when shading correction is executed on an image on the sheet P read by the reading device 201.

In the image reader 200, a first conveying guide plate 206 is arranged on the downstream side of the first conveying roller pair 203 in the sheet conveyance direction and on the upstream side of the reading device 201 (density reference member 202) in the conveyance direction of the sheet P. In the image reader 200, a second conveying guide plate 207 is arranged on the upstream side of the second conveying roller pair 204 in the conveyance direction of the sheet P and on the downstream side of the reading device 201 (density reference member 202) in the sheet conveyance direction. The first conveying guide plate 206 and the second conveying guide plate 207 serve as guides when the sheet P is conveyed and limit a moving range of the sheet P.

Figure 3:
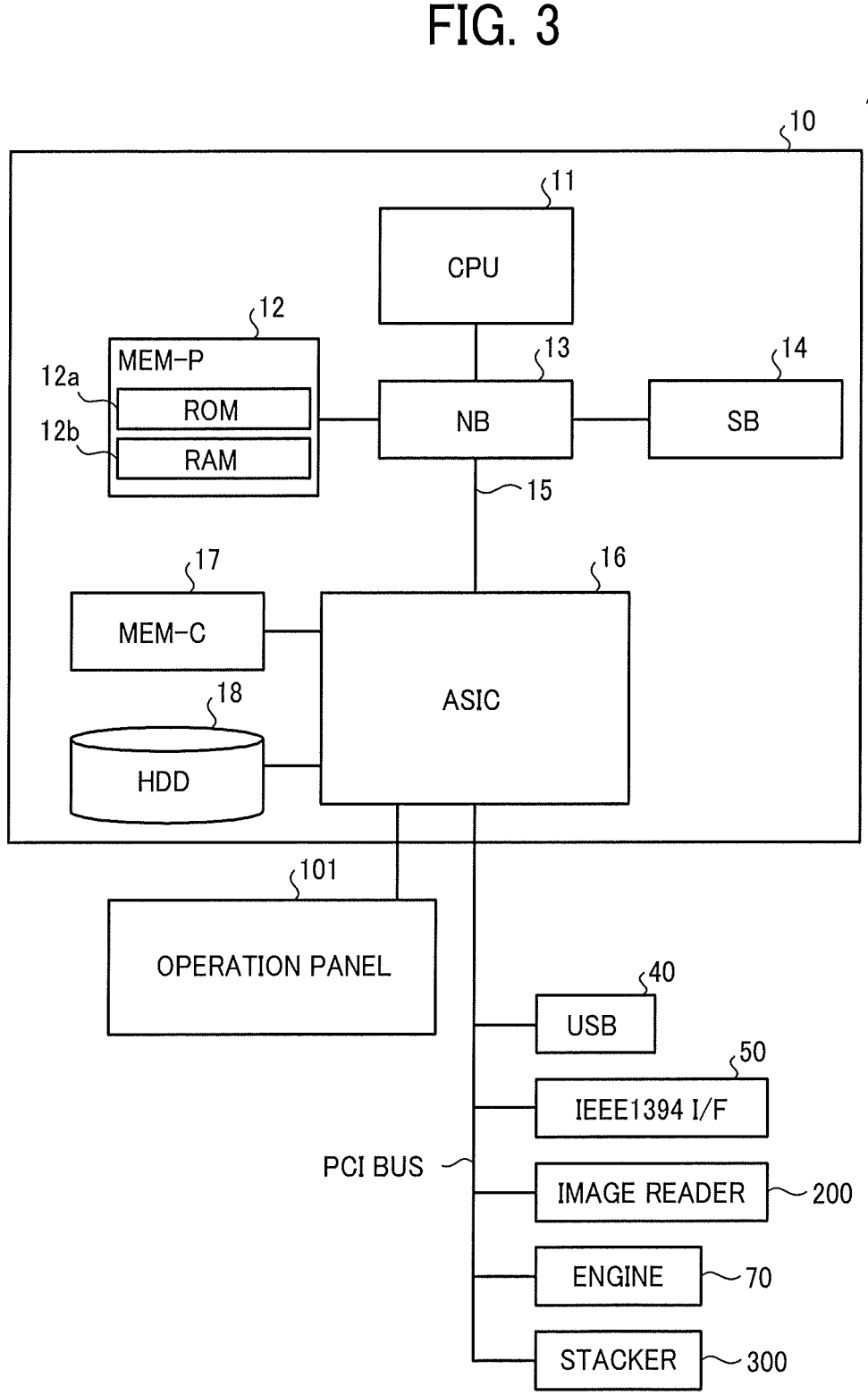
FIG. 3 is a block diagram of exemplary electrical connection of hardware of the printing system.

FIG. 3 is a block diagram of exemplary electrical connection of hardware of the printing system 1.

As illustrated in FIG. 3, the printing system 1 has a configuration in which a controller 10, the image reader 200, an engine 70, and the stacker 300 are connected via a PCI bus. The controller 10 controls the entire printing system 1, and controls drawing, communication, and inputs from the operation panel 101 which is an operation display. In addition to the reading device 201, the image reader 200 includes portions for executing image processing such as shading correction and gamma conversion. The engine 70 can be connected to the PCI bus and is, for example, a print engine such as a plotter including the image forming units 103Y, 103M, 103C, and 103K.

The controller 10 includes a Central Processing Unit (CPU) 11, a north bridge (NB) 13, a system memory (MEM-P) 12, a south bridge (SB) 14, a local memory (MEM-C) 17, an Application Specific Integrated Circuit (ASIC) 16, and a hard disk drive (HDD) 18. An Accelerated Graphics Port (AGP) 15 connects between the north bridge (NB) 13 and the ASIC 16. Furthermore, the MEM-P 12 further includes a ROM 12a and a RAM 12b.

The CPU 11 controls the entire printing system 1, includes a chip set including the NB 13, the MEM-P 12, and the SB 14, and is connected to other devices via the chip set.

The NB 13 is a bridge to connect the CPU 11 to the MEM-P 12, the SB 14, and the AGP bus 15, and includes a memory controller for controlling reading and writing from/to the MEM-P 12, a PCI master, and an AGP target.

The MEM-P 12 is a system memory used as a memory for storing a program and data, a memory for developing a program and data, a drawing memory for a printer and the like and includes the ROM 12a and the RAM 12b. The ROM 12a is a read-only memory used as a memory for storing a program and data, and the RAM 12b is a writable and readable memory used as a memory for developing a program and data and a drawing memory for a printer.

The SB 14 is a bridge to connect the NB 13 to a PCI device and peripheral devices. The SB 14 is connected to the NB 13 via the PCI bus, and the PCI bus is connected to a network interface (I/F) and the like.

The ASIC 16 is an Integrated Circuit (1C) for image processing having a hardware element for image processing and functions as a bridge which connects the AGP bus 15, the PCI bus, the HDD 18, and the MEM-C 17. The ASIC 16 includes a PCI target, an AGP master, an arbiter (ARB) forming a core of the ASIC 16, a memory controller for controlling the MEM-C 17, a plurality of Direct Memory Access Controllers (DMAC) for rotating image data by hardware logic and the like, and a PCI unit for transferring data to the engine 70 via the PCI bus. The ASIC 16 is connected to a USB 40 and the Institute of Electrical and Electronics Engineers 1394 (IEEE1394) interface (I/F) 50 via the PCI bus. The operation panel 101 is directly connected to the ASIC 16.

The MEM-C 17 is a local memory used as an image buffer and a code buffer, and the HDD 18 is a storage for accumulating image data, programs, font data, and forms.

The AGP bus 15 is a bus interface for a graphics accelerator card proposed for accelerating graphic processing and directly accesses the MEM-P 12 with high throughput to accelerate the graphics accelerator card.

A program executed by the printing system 1 according to the present embodiment may be recorded in a computer-readable recording medium such as a CD-ROM, a flexible disk (FD), a CD-R, a Digital Versatile Disk (DVD), and the like as a file in an installable or executable format to be provided.

Furthermore, the program executed by the printing system 1 according to the present embodiment may be stored in a computer connected to the network such as the Internet and provided by being downloaded via the network. Furthermore, the program executed by the printing system 1 according to the present embodiment may be provided or distributed via a network such as the Internet.

Figure 4:
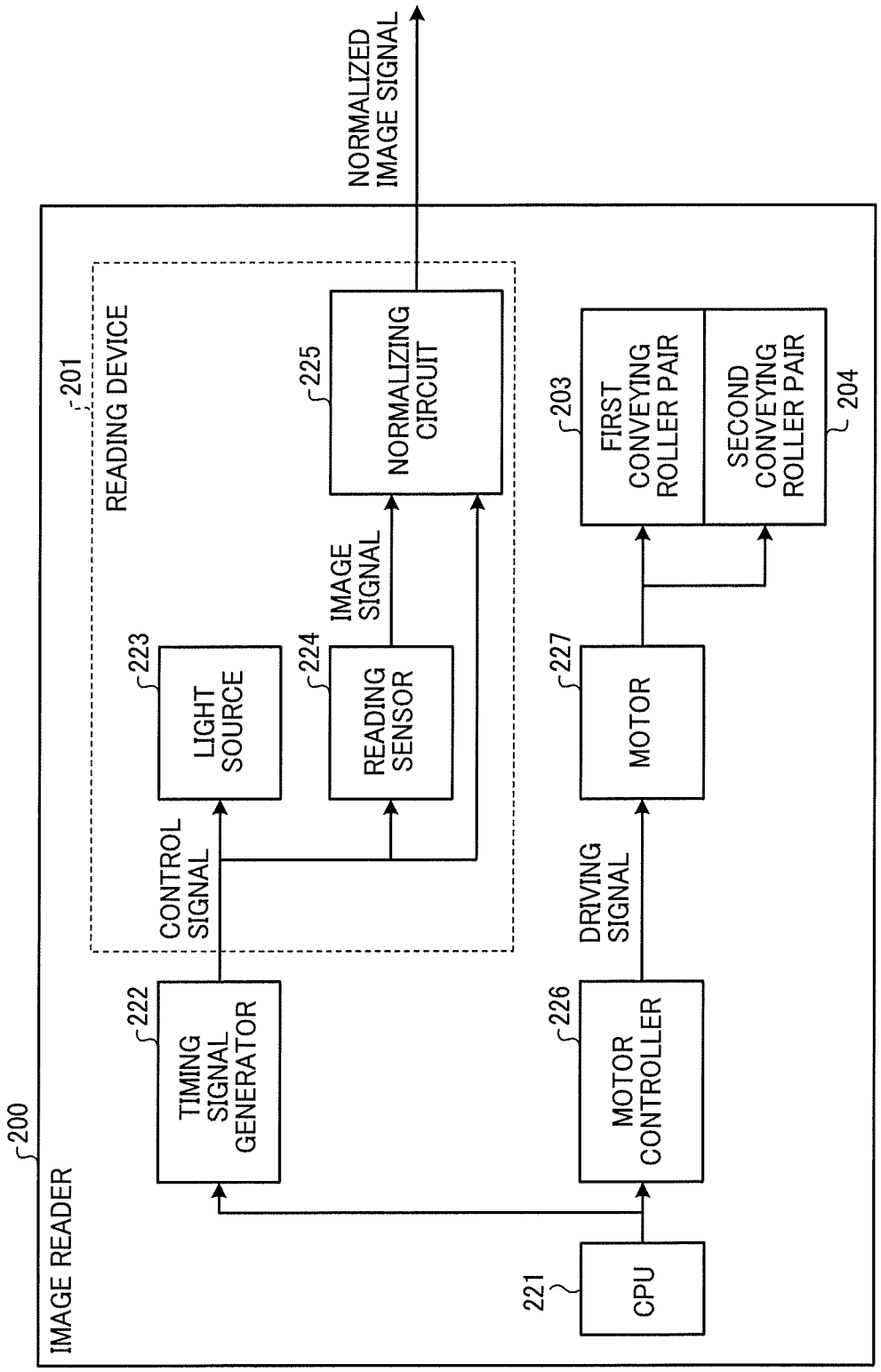
FIG. 4 is a block diagram of exemplary electrical connection of hardware of the image reader.

FIG. 4 is a block diagram of exemplary electrical connection of hardware of the image reader 200. As illustrated in FIG. 4, the image reader 200 includes the reading device 201, a Central Processing Unit (CPU) 221 which controls the reading device 201, a motor 227 which drives the first conveying roller pair 203 and the second conveying roller pair 204, a motor controller 226 which generates a driving signal to drive the motor 227, and a timing signal generator 222 which controls and drives the reading device 201.

The motor controller 226 is a driver which drives the motor 227 so that a relative relation between a reading position of the reading device 201 and the sheet P held by the first conveying roller pair 203 and the second conveying roller pair 204 becomes constant. Specifically, the motor controller 226 drives the motor 227 so that the first conveying roller pair 203 and the second conveying roller pair 204 have the same speed reduction ratio. Therefore, because the roller radius of each roller of the second conveying roller pair 204 is designed to be slightly larger than the roller radius of each roller of the first conveying roller pair 203, a linear speed at the second conveying roller pair 204 is slightly faster than that at the first conveying roller pair 203. Since the first conveying roller pair 203 and the second conveying roller pair 204 are driven by the single motor 227 in this way, it is possible to reduce the size of the device and suppress an increase in cost.

The reading device 201 includes a light source 223 which irradiates the sheet P with light, a reading sensor 224 which receives the reflection light from the sheet P and converts the light into an image signal, and a normalizing circuit 225 which normalizes a dynamic range and an RGB balance of the image signal from the reading sensor 224 and outputs the normalized signal to the outside.

Here, the description on the reading device 201 will be supplemented. In the reading device 201, either one of a contact image sensor (CIS) or a reduction optical system using a reading device such as a CCD may be used. In a case of the contact image sensor (CIS), the light source 223, the reading sensor 224, and a lens are integrated in general. Furthermore, in a case of the reduction optical system, the reading sensor 224 is a CCD or a CMOS sensor and includes a mirror for returning the reflection light from the sheet P and guides the light to the CCD, a lens, and the light source 223.

Description on Functional Configuration of Printing System 1

Next, functions achieved by executing the programs stored in the HDD 18 and the ROM 12a by the CPU 11 of the printing system 1 will be described. Note that, here, description on the functions which have been known in conventional is omitted, and a density correction function which is characteristics of the printing system 1 according to the present embodiment will be described in detail.

Figure 5:
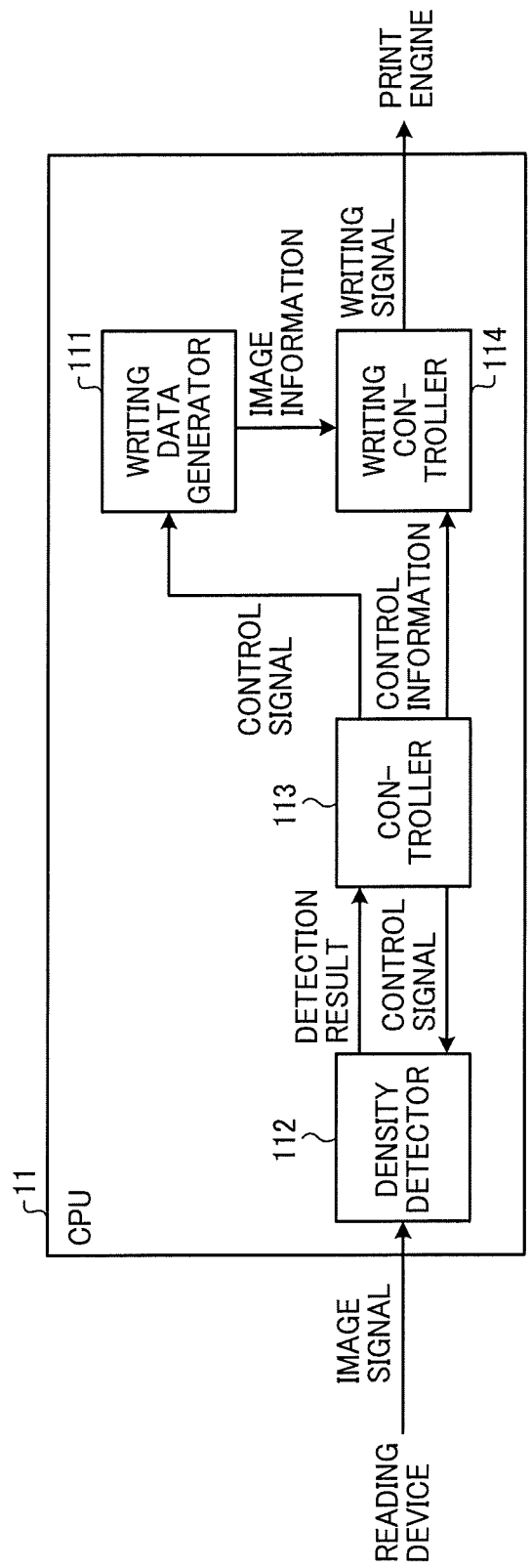
FIG. 5 is a functional block diagram of a functional configuration of the printing system.

FIG. 5 is a functional block diagram of a functional configuration of the printing system 1.

As illustrated in FIG. 5, the CPU 11 of the printing system 1 is a printing controller. The CPU 11 of the printing system 1 functions as a density detector 112, a controller 113, a writing controller 114, and a writing data generator 111. It goes without saying that the CPU 11 may implement a function of a conveyance controller for controlling the conveyance of the sheet P and the like in addition to the density detector 112, the controller 113, the writing controller 114, and the writing data generator 111.

In the present embodiment, the characteristic function of the printing system 1 is implemented by executing the program by the CPU 11. However, embodiments of the present disclosure are not limited to such a configuration, and a part of or all of the functions of the above units may be implemented by a dedicated hardware circuit.

The density detector 112 holds a conversion parameter in which RGB data which is obtained by reading an arbitrary color patch printed by the printing apparatus 100 in advance by the reading device 201 is associated with color information which is obtained by measuring a color patch of the ejected sheet P by a colorimeter. The density detector 112 converts the image signal which is read to be obtained by the reading device 201 into density information by using the conversion parameter which has been held in advance.

In addition, the density detector 112 has a function for averaging the density information in a range instructed by the controller 113 and removes noise to execute image correction processing.

The controller 113 outputs a control signal indicating an image detection start timing to the density detector 112. Furthermore, the controller 113 converts the density information from the density detector 112 into image writing information at the main scanning position and notifies the writing controller 114 of the information. The controller 113 outputs a control signal indicating a timing to transmit image information which has been held in the writing data generator 111 in advance to the writing controller 114.

The writing data generator 111 transmits the image information, which has been held in advance, to the writing controller 114 in response to an instruction from the controller 113.

The writing controller 114 performs image writing control on the sheet P based on the image writing information and the image information.

With the above configuration, the image reader 200 detects the image density of the sheet P in the density correction processing relative to the main scanning position.

Figure 6:
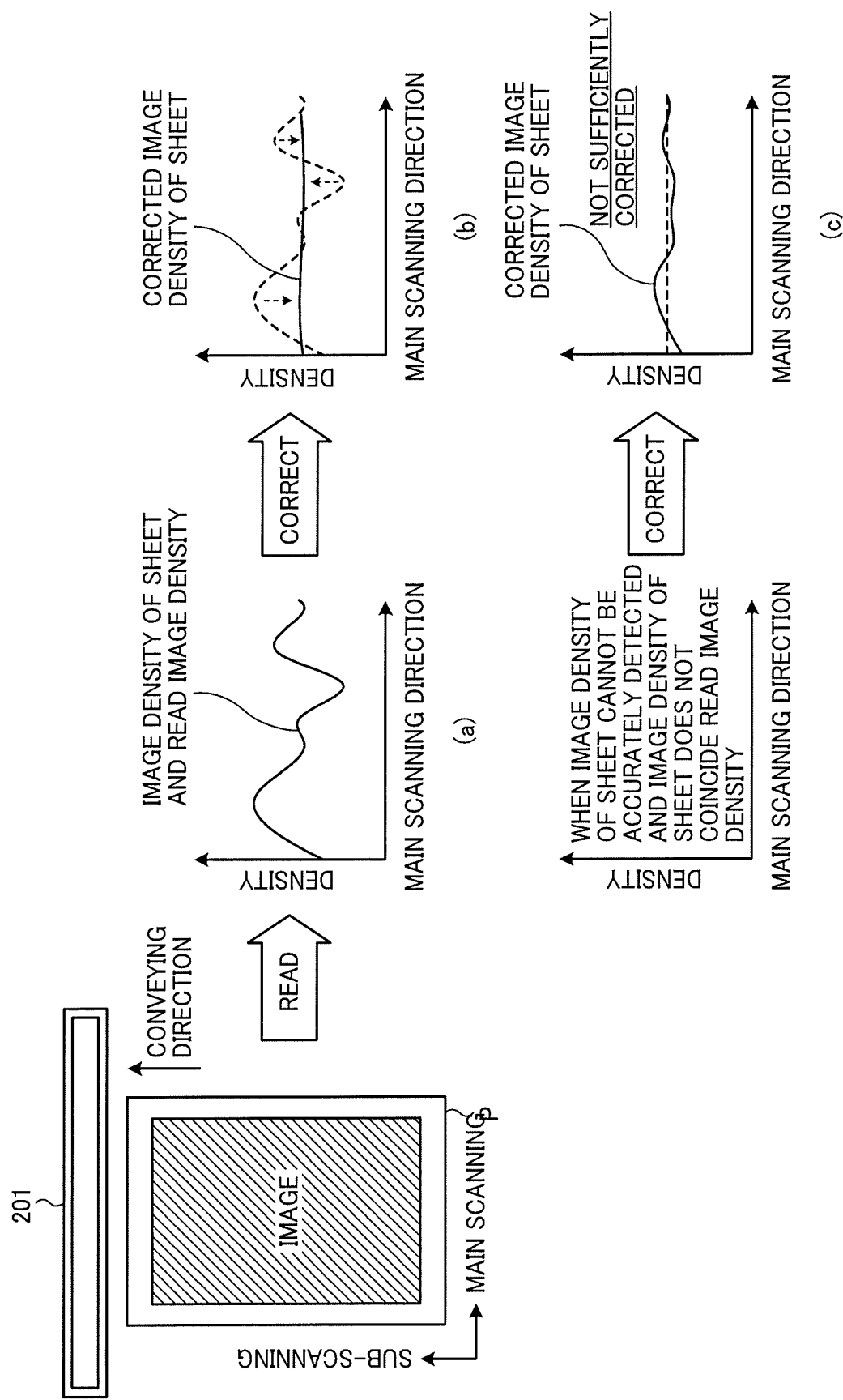
FIG. 6 is a diagram for explaining a density correction technology relative to a main scanning position.

Here, a density correction technology relative to the main scanning position by the controller 113 will be described. FIG. 6 is a diagram for explaining the density correction technology relative to the main scanning position.

As illustrated in FIG. 6, after obtaining a density distribution of the image on the sheet P relative to the main scanning position from the density detector 112 by using the reading device 201, the controller 113 feeds back the obtained distribution as a laser intensity when optical writing is performed on the writing controller 114 to flatten the density distribution. By performing such density correction, an image having uniform density in the main scanning direction can be obtained after performing the density correction.

Regarding the density correction technology described above, it is important to detect a correct image density of the sheet P by the reading device 201. This is because when a density which is different from the original image density is detected, an output image which has been corrected based on the detection result is not uniformly corrected as intended.

In (a) in FIG. 6, it is indicated that the image density of the sheet P to be read coincides a read image density which has been read from the sheet P with high accuracy. In (b) in FIG. 6, as a result of feeding back the result of (a), a result is indicated such that the image density of the sheet P becomes uniform. On the other hand, in (c) in FIG. 6, an example of a result in a case where the image density of the sheet P is not accurately detected as in (a) is illustrated, and the image density is not correctly corrected.

Figure 7:
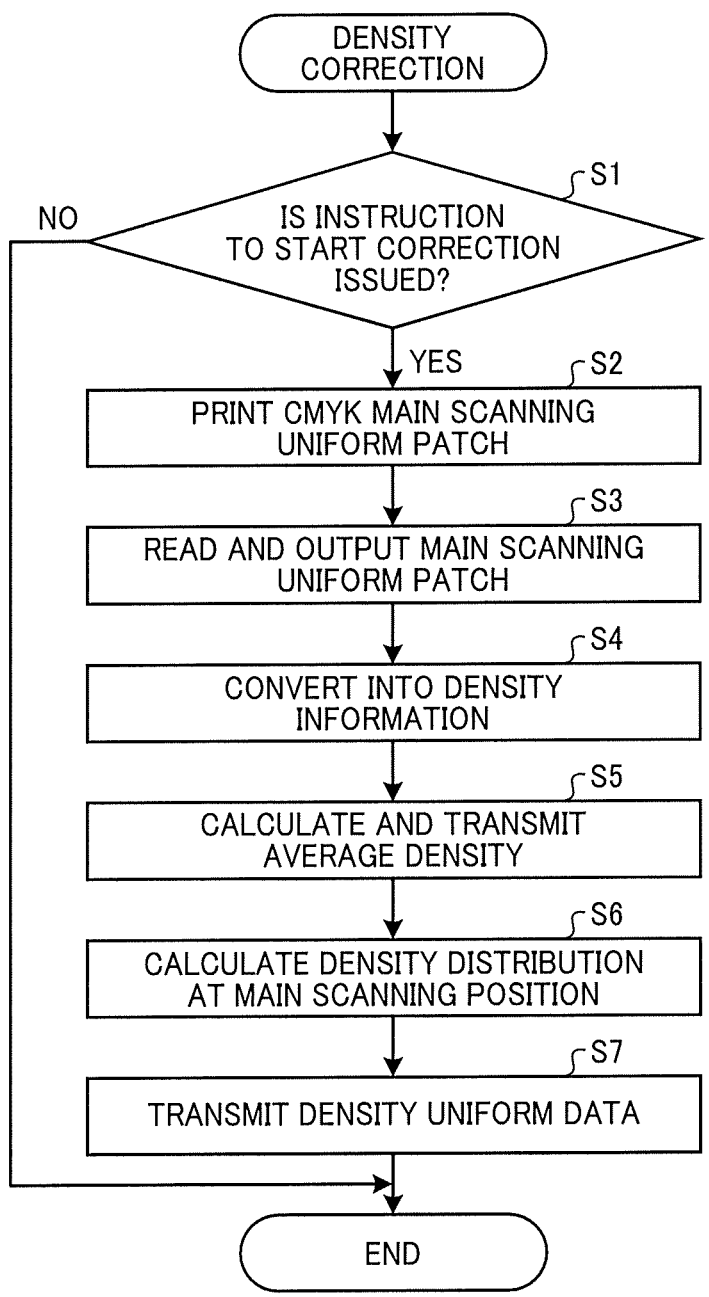
FIG. 7 is a flowchart schematically illustrating a flow of main scanning density correction processing.

Here, FIG. 7 is a flowchart schematically illustrating a flow of main scanning density correction processing. Note that the processing illustrated in FIG. 7 is executed under an adjustment mode.

First, the controller 113 determines whether main scanning density correction is specified (step S1). In a case where the controller 113 determines that the main scanning density correction is specified (Yes in step S1), the procedure proceeds to step S2. On the other hand, in a case where the controller 113 determines that the main scanning density correction is not specified (No in step S1), the procedure is terminated.

Subsequently, the controller 113 sends a CMYK main scanning uniform patch (refer to FIG. 14) held in the writing data generator 111 in advance to the writing controller 114 and prints and outputs the patch on the sheet P (step S2).

Next, the controller 113 outputs an image signal (RGB data) of the image which is obtained by reading the CMYK main scanning uniform patch printed on the sheet P in step S2 by the reading device 201 to the density detector 112 (step S3).

The density detector 112 converts the RGB data of the image read by the reading device 201 into the density information (step S4). Furthermore, the density detector 112 calculates an average density at each main scanning position which is obtained by averaging the density information in the sub-scanning direction for each of CMYK and transmits the average density to the controller 113 (step S5).

The controller 113 calculates a density distribution of the main scanning position for each of the CMYK based on the average density at each CMYK main scanning position transmitted from the density detector 112 (step S6).

Then, the controller 113 transmits a coefficient (density uniform data) to uniform the density in the main scanning direction based on the density distribution of the main scanning position for each of the CMYK obtained in step S6 to the writing controller 114 (step S7). Thereafter, the main scanning density of the sheet P printed by using the coefficient becomes uniform.

Next, a posture of the sheet P will be described.

Figure 8:
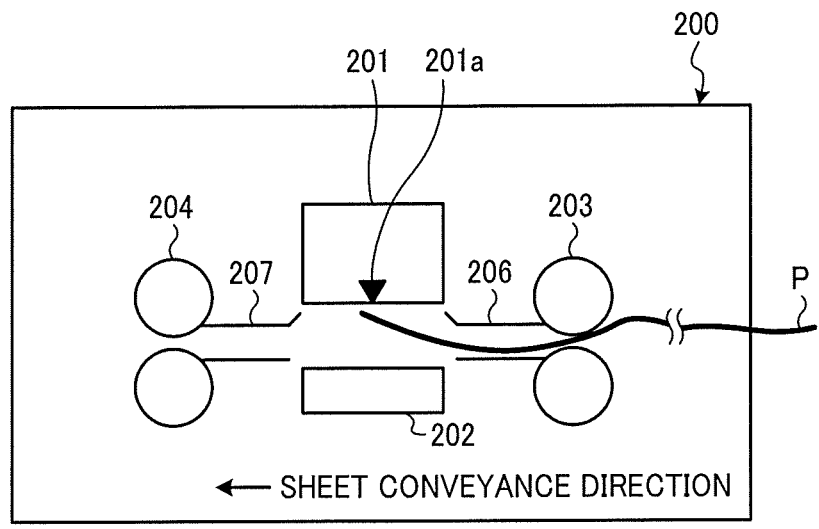
FIG. 8 is a diagram of an example of a posture of a sheet when the sheet is read by a reading device.

Here, FIG. 8 is a diagram of an example of a posture of the sheet P when being read by the reading device 201. In the example illustrated in FIG. 8, it is assumed that the sheet P be conveyed from the right to the left in FIG. 8.

As illustrated in FIG. 8, the sheet P conveyed by the first conveying roller pair 203 is guided by the first conveying guide plate 206 and passes through a reading position 201a of the reading device 201. At this time, since there is nothing to regulate a leading end of the sheet P and the leading end is free, in a case where the sheet P is curled (rounded), as illustrated in FIG. 8, the sheet P in an oblique posture is read by the reading device 201. There is no guarantee that the sheet P maintains a certain distance from the reading device 201.

That is, in a case where an image of the leading end of the sheet P in a state illustrated in FIG. 8 is used as effective data, the data has low reading accuracy.

Note that a rear end of the sheet P is similar to the leading end of the sheet P, and when an image after the sheet P has moved through the first conveying roller pair 203 is used as effective data, the data has low reading accuracy.

Figure 9:
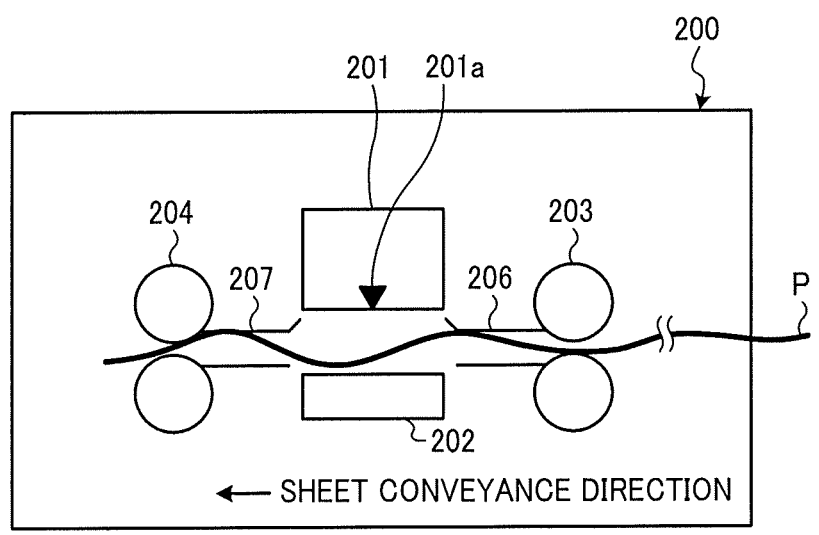
FIG. 9 is a diagram of an example of another posture of the sheet when the sheet is read by the reading device.

Here, FIG. 9 is a diagram of an example of another posture of the sheet P when being read by the reading device 201. Note that, in the example illustrated in FIG. 9, it is assumed that the sheet P be conveyed from the right to the left in FIG. 9 in a state where the sheet P is held by the first conveying roller pair 203 and the second conveying roller pair 204. In a state where the sheet P is held by the first conveying roller pair 203 and the second conveying roller pair 204 as illustrated in FIG. 9, there is a possibility that the sheet P is loosened between the first conveying guide plate 206 and the second conveying guide plate 207. In a state where the sheet P is loosened between the first conveying guide plate 206 and the second conveying guide plate 207, the sheet P is read in an oblique posture and there is no guarantee that a certain distance is maintained between the sheet P and the reading device 201.

In other words, in a case where the image of the sheet P in a state illustrated in FIG. 9 is used as the effective data, the data has low reading accuracy.

Next, a circumferential-direction speed of the conveying roller pair will be described.

Figure 10:
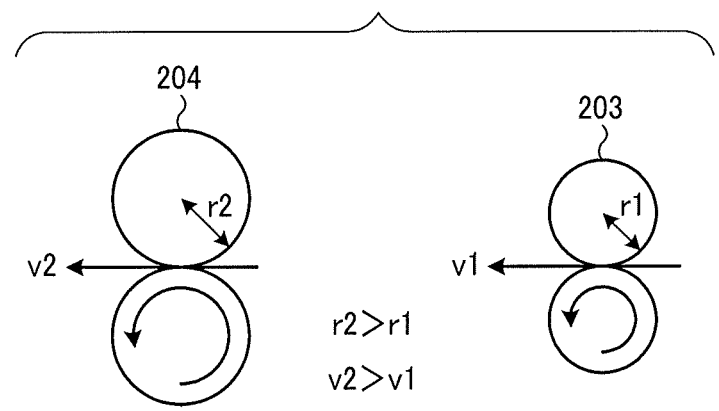
FIG. 10 is a diagram of a relation between a first conveying roller pair and a second conveying roller pair.

Here, FIG. 10 is a diagram of a relation between the first conveying roller pair 203 and the second conveying roller pair 204. As described above, the first conveying roller pair 203 and the second conveying roller pair 204 are driven by the single motor 227 at the same speed reduction ratio. Furthermore, since a roller radius r2 of each roller of the second conveying roller pair 204 is designed to be slightly larger than a roller radius r1 of each roller of the first conveying roller pair 203, the circumferential-direction speed of the second conveying roller pair 204 having the larger roller radius is faster in a case where both roller pairs rotate at the same angular speed (v2>v1). That is, regarding a conveyance speed of the single roller pair, the second conveying roller pair 204 is driven to be faster than the first conveying roller pair 203.

Subsequently, sheet conveyance according to the present embodiment will be described.

Figure 11A:
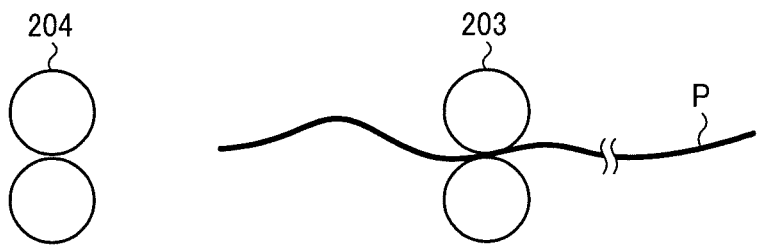
FIGS. 11A to 11C are diagrams of a process in which a sheet P is conveyed under a condition illustrated in FIG. 10.
Figure 11B:
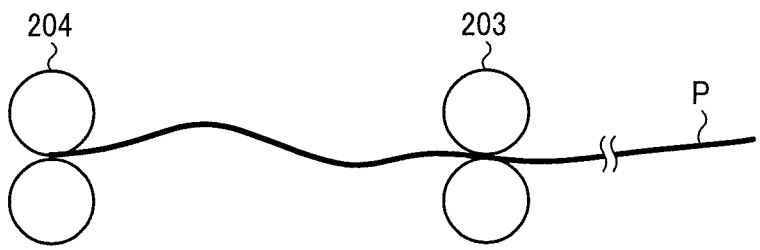
Figure 11C:
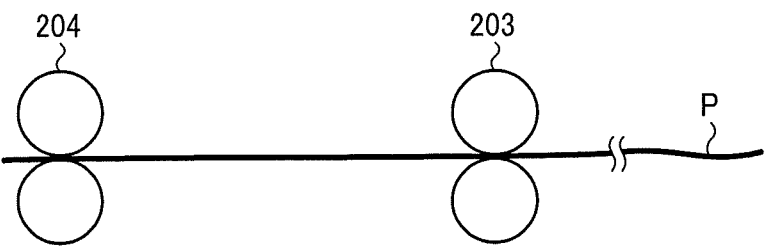

Here, FIGS. 11A to 11C are diagrams of a process in which the sheet P is conveyed under a condition illustrated in FIG. 10. First, FIG. 11A is a state where the leading end of the sheet P is free as described with reference to FIG. 8. Next, FIG. 11B is a state where the leading end of the sheet P described in FIG. 9 is just sandwiched by the second conveying roller pair 204. In this state, there is a possibility that the sheet P is loosened between the first conveying guide plate 206 and the second conveying guide plate 207. FIG. 11C is a state at the time when the leading end of the sheet P is conveyed by the second conveying roller pair 204 and the looseness of the sheet P is gradually decreased due to the circumferential-direction speed and is eliminated. Thereafter, in a state of holding the sheet P, the first conveying roller pair 203 and the second conveying roller pair 204 convey the sheet P at a balanced conveyance speed via the held sheet P. As a result, since the sheet P is stretched and conveyed, the sheet P can be read in a state where the looseness of the sheet P is reliably eliminated. Therefore, a stable image can be obtained.

Next, a positional relation between the first conveying roller pair 203, the second conveying roller pair 204, the reading position 201a of the reading device 201, and the sheet P will be described in detail.

Figure 12:
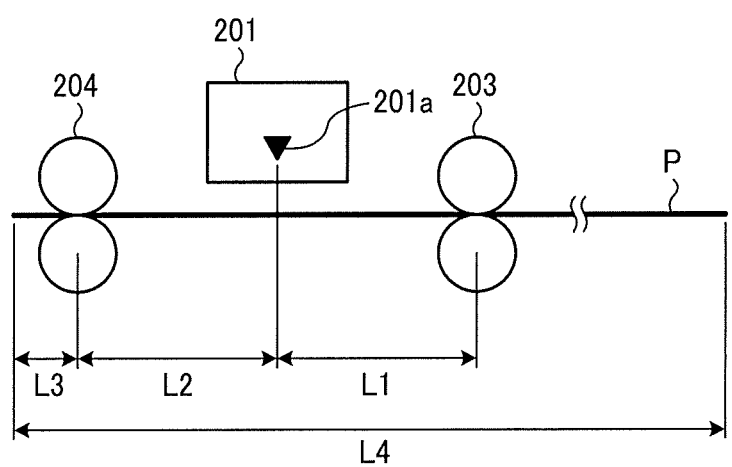
FIG. 12 is a diagram of a positional relation of units configuring the image reader.

FIG. 12 is a diagram of a positional relation of units configuring the image reader 200. As illustrated in FIG. 12, it is assumed that a distance between the first conveying roller pair 203 and the reading position 201a of the reading device 201 be L1, a distance between the second conveying roller pair 204 and the reading position 201a of the reading device 201 be L2, a distance between the second conveying roller pair 204 and the leading end of the sheet P in a state of FIG. 11C be L3, and the length of the sheet P be L4.

Figure 13:
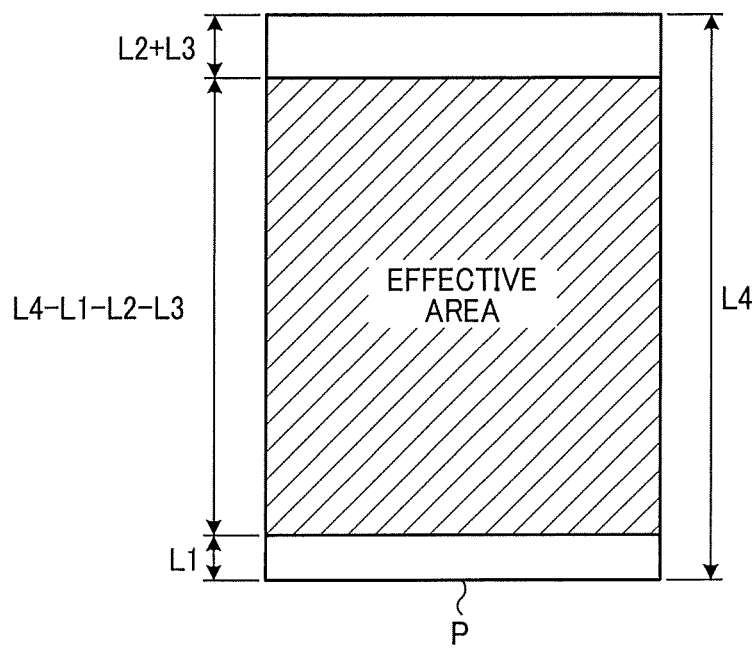
FIG. 13 is a diagram for explaining an effective area of a read image of a sheet in the positional relation illustrated in FIG. 12.

Here, FIG. 13 is a diagram for explaining an effective area of a read image of the sheet P in the positional relation illustrated in FIG. 12. As illustrated in FIG. 13, a relative relation between the reading position 201a of the reading device 201 and the sheet P held by the first conveying roller pair 203 and the second conveying roller pair 204 is constant in an area between a first line that is away from the leading end of the sheet P by a distance L2+L3 and a second line that is away from the rear end of the sheet P by a distance L1. This area is referred to as an effective area.

Figure 14:
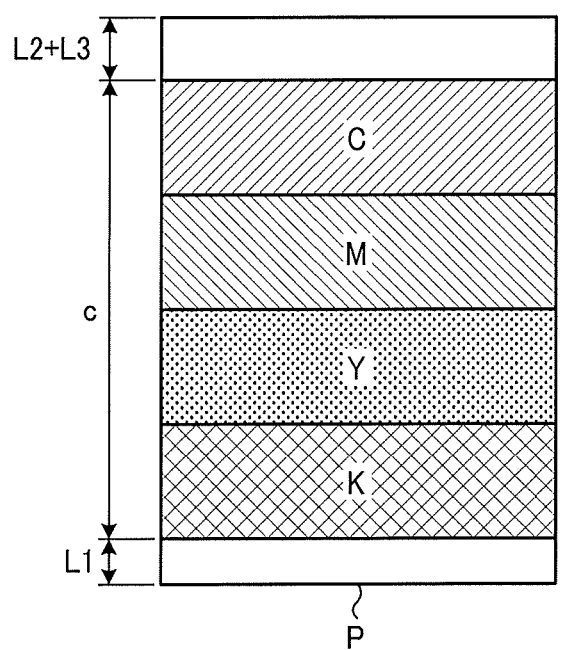
FIG. 14 is a diagram of an exemplary CMYK main scanning uniform patch used at the time of the main scanning density correction.

Here, FIG. 14 is a diagram of an exemplary CMYK main scanning uniform patch used at the time of the main scanning density correction. An area c illustrated in FIG. 14 is an effective area of the read image of the sheet P. The CMYK main scanning uniform patches used at the time of the main scanning density correction are printed in the area c in order of CMYK. Since the image reader 200 needs to read an image with high accuracy to correct nonuniformity in the main scanning direction, the CMYK main scanning uniform patch is designed to be within the effective area.

Accordingly, it is possible to perform correction with high accuracy in image formation conditions (color, density unevenness, and the like) based on the image data which has been read with high accuracy.

As described above, according to the present embodiment, since an arbitrary color patch on the sheet (recording medium) with a simple configuration and simple control and is used for detection of the density information can be color-measured with high accuracy without using a mechanism which variably controls a positional relation of each unit to be appropriate, the image formation conditions (color, density unevenness, and the like) can be corrected without increasing the size of the device and without largely increasing the cost.

In the above-described embodiment, an example has been described in which the image reader and the image forming apparatus according to an embodiment of the present disclosure are applied to the printing system including the electrophotographic printing apparatus. However, embodiments of the present disclosure are not limited to such a configuration, and the image reader and the image forming apparatus can be applied to a printing system including an inkjet-type printing apparatus.

In the above-described embodiment, an example has been described in which the image reader and the image forming apparatus according to an embodiment of the present disclosure are applied to the printing system including the printing apparatus such as a commercial printer (production printer) and the like. However, embodiments of the present disclosure are not limited to such a configuration, and the image reader and the image forming apparatus can be applied to any one of image forming apparatus such as a multifunction peripheral, a copying machine, a printer, a scanner, and a facsimile having at least two functions of a copying function, a printer function, a scanner function, and a facsimile function.

In addition, in the above-described embodiment, an example has been described in which the image reader according to an embodiment of the present disclosure is applied to position detection in an image forming field. However, embodiments of the present disclosure are not limited to such a configuration, and for example, the image reader can be applied to position detection applications in various fields such as inspection in a field of FA.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image reader, comprising:
   a reading device configured to read an image from a recording medium;
   a first conveying roller pair located on an upstream side of the reading device in a conveyance direction of the recording medium;
   a second conveying roller pair located on a downstream side of the reading device in the conveyance direction of the recording medium, the first conveying roller pair and the second conveying roller pair holding the recording medium together; and
   a driver configured to drive the first conveying roller pair and the second conveying roller pair so that a relative relation between a reading position of the reading device and the recording medium held by the first conveying roller pair and the second conveying roller pair is constant, wherein
   the reading device is configured to determine that the image read from the recording medium is effective in a period in which the relative relation is constant,
   a roller radius of the second conveying roller pair is larger than a roller radius of the first conveying roller pair, and
   the first conveying roller pair and the second conveying roller pair have a same speed reduction ratio.

2. The image reader according to claim 1, wherein a linear speed of the first conveying roller pair is slower than a linear speed of the second conveying roller pair.

3. The image reader according to claim 1, wherein the driver is configured to drive the first conveying roller pair and the second conveying roller pair so as to convey the recording medium at a balanced conveyance speed when the first conveying roller pair and the second conveying roller pair hold the recording medium.

4. An image forming apparatus, comprising:
   the image reader according to claim 1;
   a print engine; and
   processing circuitry configured to:
      control conveyance of the recording medium to the print engine;
      obtain a conversion parameter associated with color information by reading a color patch printed on the recording medium by the reading device;
      convert an image signal of the image into density information based on the conversion parameter, the image signal including red, green, and blue (RGB) data of the image;
      calculate a density distribution of the image in a main scanning direction based on the density information;
      correct a density of the image based on the calculated density distribution; and
      cause the print engine to perform density correction based on the corrected density.

5. The image forming apparatus according to claim 4, wherein the processing circuitry is configured to cause the print engine to print the color patch on a region which is read in the period in which the relative relation is constant.

6. The image forming apparatus according to claim 4, wherein
   the RGB data of the image is obtained by reading a cyan, magenta, yellow, and black, (CYMK) main scanning patch printed on the recording medium.

7. A density correcting method, comprising:
   controlling a reading device to read a color patch printed in advance on a recording medium;
   controlling a motor to drive both a first conveying roller pair having a first roller radius and a second conveying roller pair having a second roller radius larger than the first roller radius at a same angular speed so that a relative relation between a reading position of the reading device and the recording medium held by the first conveying roller pair located on an upstream side of the reading device in a conveyance direction of the recording medium and the second conveying roller pair located on a downstream side of the reading device in the conveyance direction of the recording medium is constant; and
   reading the color patch used for the density correction from the recording medium in a period in which the relative relation is constant.

8. The density correcting method according to claim 7, wherein
   the RGB data of the image is obtained by reading a cyan, magenta, yellow, and black, (CYMK) main scanning patch printed on the recording medium.

9. A non-transitory recording medium storing computer-readable instructions, which when executed by a computer, cause the computer to perform a density correcting method, the method comprising:
   controlling a reading device to read a color patch printed in advance on a recording medium;
   controlling a motor to drive both a first conveying roller pair having a first roller radius and a second conveying roller pair having a second roller radium larger than the first roller radius at a same angular speed so that a relative relation between a reading position of the reading device and the recording medium held by the first conveying roller pair located on an upstream side of the reading device in a conveyance direction of the recording medium and the second conveying roller pair located on a downstream side of the reading device in the conveyance direction of the recording medium is constant; and reading the color patch used for the density correction from the recording medium in a period in which the relative relation is constant.

10. The method according to claim 9, wherein the RGB data of the image is obtained by reading a cyan, magenta, yellow, and black, (CYMK) main scanning patch printed on the recording medium.

* * * * *